United States Patent [19]

Stine

[11] Patent Number: 4,672,901
[45] Date of Patent: Jun. 16, 1987

[54] AUGER HOLE DIRT RETAINER

[76] Inventor: Joseph P. Stine, 1159 Harbour Island Rd., Orlando, Fla. 32809

[21] Appl. No.: 751,280

[22] Filed: Jul. 2, 1985

[51] Int. Cl.$^4$ .......................... A01C 5/00; A01C 13/00
[52] U.S. Cl. ...................................................... 111/2
[58] Field of Search .......................... 37/142.5, 116, 2; 405/244; 294/68.21; 175/84, 88; 111/2; 47/76

[56] References Cited

U.S. PATENT DOCUMENTS

| 2,222,083 | 11/1940 | Lintz | 294/68.21 |
| 3,120,957 | 2/1964 | Tillman | 37/2 R |
| 3,747,697 | 7/1973 | Russell | 175/88 |
| 3,936,960 | 2/1976 | Clegg | 47/76 |
| 4,057,117 | 11/1977 | Bermingham | 294/68.21 |
| 4,323,019 | 4/1982 | Haddock | 111/2 |

FOREIGN PATENT DOCUMENTS

| 1027455 | 4/1958 | Fed. Rep. of Germany | 111/2 |
| 211915 | 2/1968 | U.S.S.R. | 111/2 |
| 309672 | 9/1971 | U.S.S.R. | 111/2 |
| 436631 | 1/1975 | U.S.S.R. | 111/2 |

Primary Examiner—James R. Feyrer
Attorney, Agent, or Firm—Duckworth, Allen & Dyer

[57] ABSTRACT

In an earth planting process which entails the boring and refilling of a hole, a method and apparatus are provided to accumulate extracted soil in a container whose configuration is defined by two rigid and concentric cylinders which are joined by a flexible membrane. Raising of the outer cylinder causes the container to assume a funnel shape so that it can be used to pour the extracted soil back into the hole after the removal of a boring tool and possible placement of a plant, post or other object in the hole.

8 Claims, 6 Drawing Figures

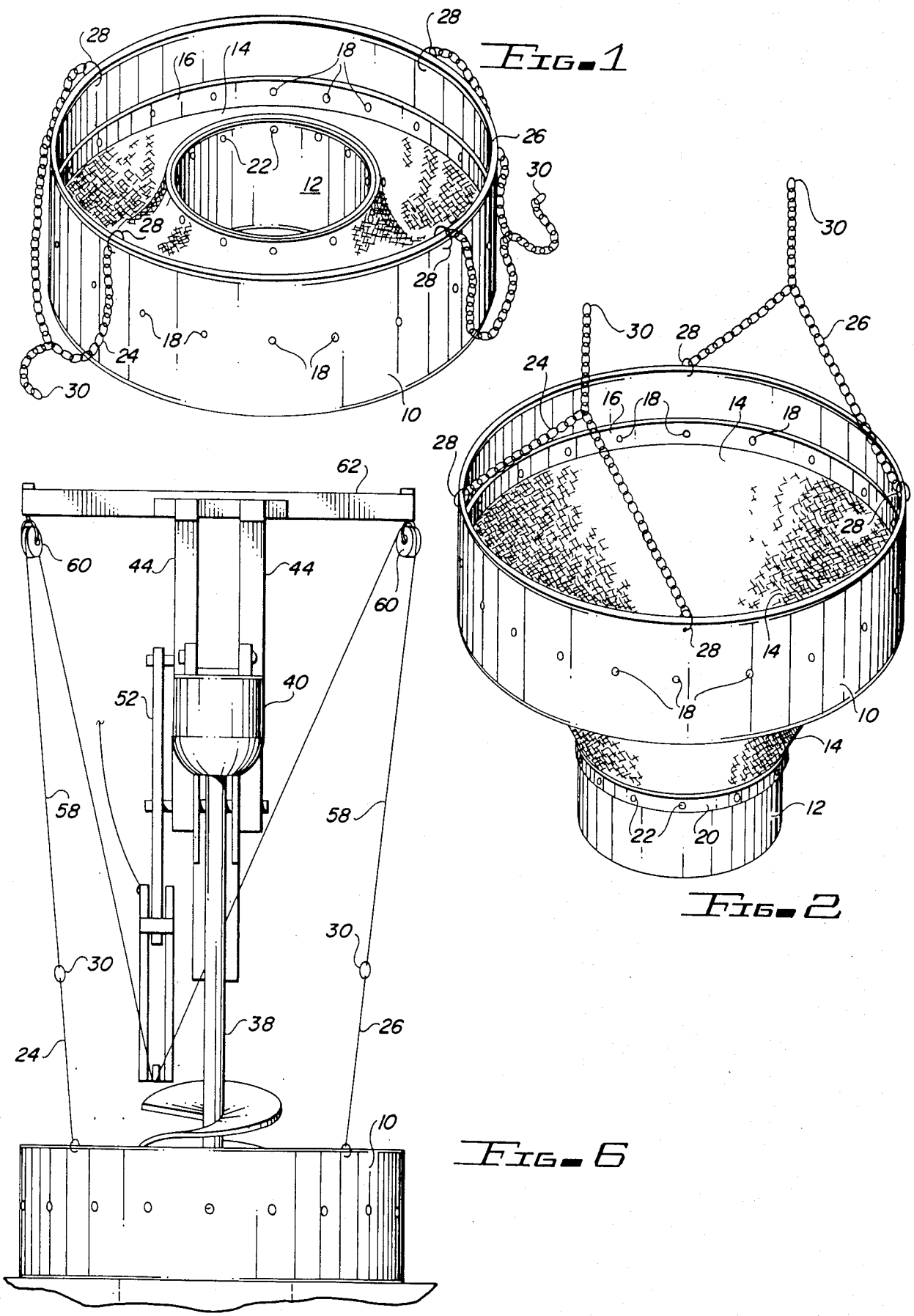

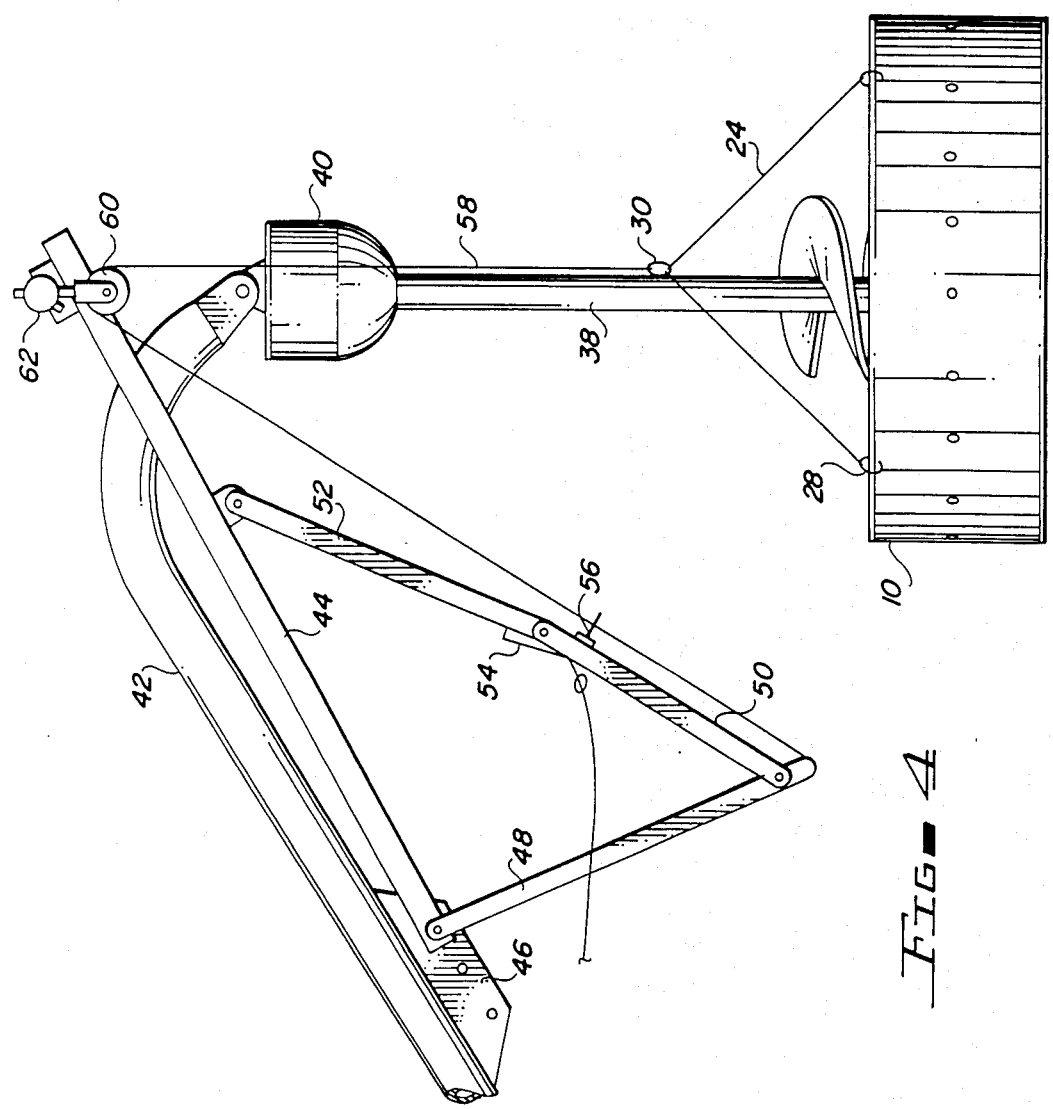
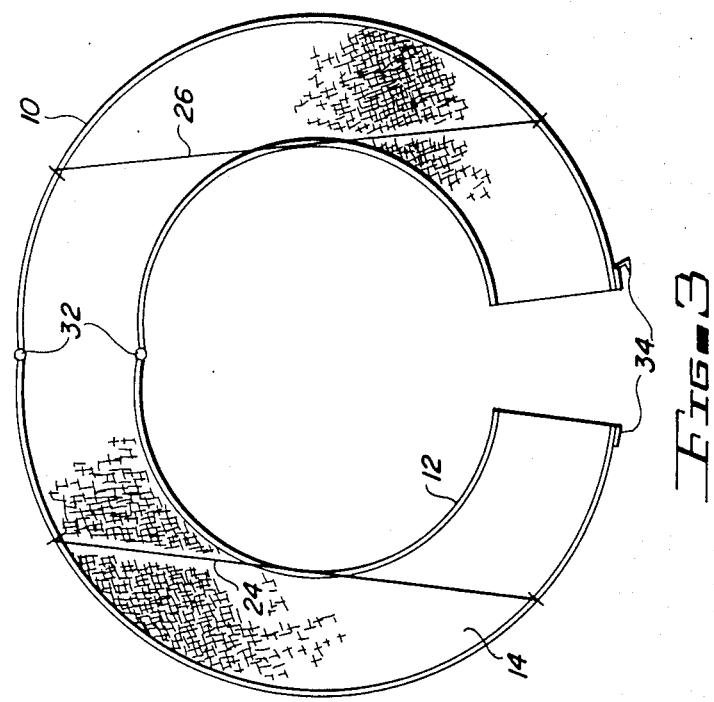
FIG-4
FIG-3

AUGER HOLE DIRT RETAINER

BACKGROUND OF THE INVENTION

The present invention relates to planting systems and, more particularly to a method and appartus for preparing a tree or bush planting hole.

In the typical method of preparing a hole for receipt of a plant such as a tree or bush, or even for preparing a hole to receive a pole or a post, the earth is typically extracted from the hole and deposited to one side. The object to be planted is then placed in the hole and the dirt either pushed back into the hole around the object by use of a hand or by some other tool such as shovel or hoe. In the mechanized process of preparing a planting hole, a typical tool used in such process is a large auger. The auger is a screw type of device which screws itself into the ground and simultaneously forces the earth to ride up the lands of the auger and be deposited in a concentric circle around the upper surface of the hole. After the auger has prepared the hole, the tree or bush or other object is then placed in the hole and the dirt must be manually returned to the hole about the object.

On nursery farms where large volumes of trees or shrubbery are grown for subsequent excavation and removal for sale to consumers, there has been developed a new process for preparing a planting hole which restricts the development of long roots so as to minimize the effort required to excavate the tree or shrubbery. This new method involves the utilization of an inground container which restricts major root growth and which thus permits the tree or shrubbery to be easily moved from the ground at the time that the tree or shrub is harvested. In this method of planting, the hole is dug in the earth and the container is then placed in the hole. The dirt which was excavated from the hole is then placed back in the container. Subsequently, a small tree or shrub may be easily planted in the earth within the container and allowed to grow to a proper size for harvesting. At harvesting the entire container along with the tree or shrub is removed from the ground. The in-ground container has sufficient strength to hold together the earth and root structure of a tree or shrub which is planted in the container. Such containers are available from Root Control, Inc. of Oklahoma City, Okla.

In the above described planting method, the diameter of the earth hole may vary between 9 and 24 inches to fit a variety of sizes. Typically, the hole is dug using an auger of the proper size which is driven by the power take-off on a standard farm tractor. The tractor moves the auger to the location for preparing the planting hole and digs the hole using the auger. As disclosed above, the auger typically leaves the dirt excavated from the hole in a concentric ring surrounding the hole. After the container is placed in the hole, the dirt is pushed or shovelled back into the container for later receiving a plant or shrub. Because the in-ground container is a relatively thin material which does not have sufficient strength to support its own shape, the sides of the container are normally held in place by a rigid cylindrical insert which is then removed after the dirt has been placed back into the container within the earth hole. Thus, although the process for actually digging has been mechanized and automated, the process of returning the earth to the hole and finally preparing the hole for planting still requires additional manual labor.

It is an object of the present invention to provide a method and appartus for preparing a planting hole which overcomes the deficiencies of the prior art.

It is a still further object of the present invention to provide a method and apparatus for preparing a planting hole which mechanizes the process of returning the earth to the hole.

SUMMARY OF THE INVENTION

The present invention comprises an improved apparatus and method for preparing a planting hole in which the holes are first excavated using an auger operated from power equipment such as a tractor in which the power equipment includes a boom for raising and lowering the auger. The improved apparatus includes an earth retainer for catching the earth extracted by the auger. The retainer includes an inner cylinder which fits closely around the auger but permits the auger to pass through the inner cylinder. An outer cylinder concentric with the inner cylinder defines a space sufficient to contain the earth extracted from the hole. The inner cylinder is attached to the outer cylinder by means of a flexible membrane which also functions to contain the earth. In its rest position, the earth retainer has both the inner and outer cylinders resting on the ground with the membrane connecting them. The dirt excavated by the auger is thus trapped by the outer cylinder and rests upon the membrane. After the auger has been removed from the hole and the in-ground container positioned in place, the outer cylinder is lifted upwards causing the membrane to be stretched between the inner and outer cylinders to form a funnel shape which causes the earth to slide off the membrane and into the hole.

In one embodiment, the earth retainer includes lifting apparatus attached to the boom which controls the auger. The lifting apparatus utilizes a lifting cable attached to the top edge of the outer cylinder and passing over pulleys located at the upper end of the boom above the auger. The lifting cable is attached to a two-position latching mechanism which has a first position allowing the earth retainer and auger to be raised or lowered simultaneously and a second position which permits the auger to be raised without raising the earth retainer. This two-position latching mechanism allows the earth to be returned to the hole after the in-ground container has been inserted or after a tree or shrub has been planted or permits the auger to be raised while permitting the earth retainer to remain on the ground.

In another aspect of the invention, for those situations in which the object to be planted is of such height that the boom is not capable of raising the earth retainer over the top of the object, the earth retainer is formed in two hinged sections which can be opened to allow the earth retainer to be removed to the side of the object.

BRIEF DESCRIPTION OF THE DRAWINGS

For a better understanding of the present invention, reference may be had to the following detailed description taken in conjunction with the accompanying drawings in which:

FIG. 1 is a perspective view of one form of the inventive auger hole dirt retainer shown in a lowered position resting on a level surface;

FIG. 2 is a perspective view of the retainer of FIG. 1 in a raised position;

FIG. 3 is a perspective view of an alternate embodiment of the inventive retainer in which there are illustrated two-piece cylindrical cylinders;

FIG. 4 is a planar view of the auger and earth retainer lifting mechanism with the auger and retainer arranged for concurrent lifting;

FIG. 6 is a planar view of the lifing mechanism of FIG. 4 as viewed from the auger end of the boom.

DETAILED DESCRIPTION

Figure 5:
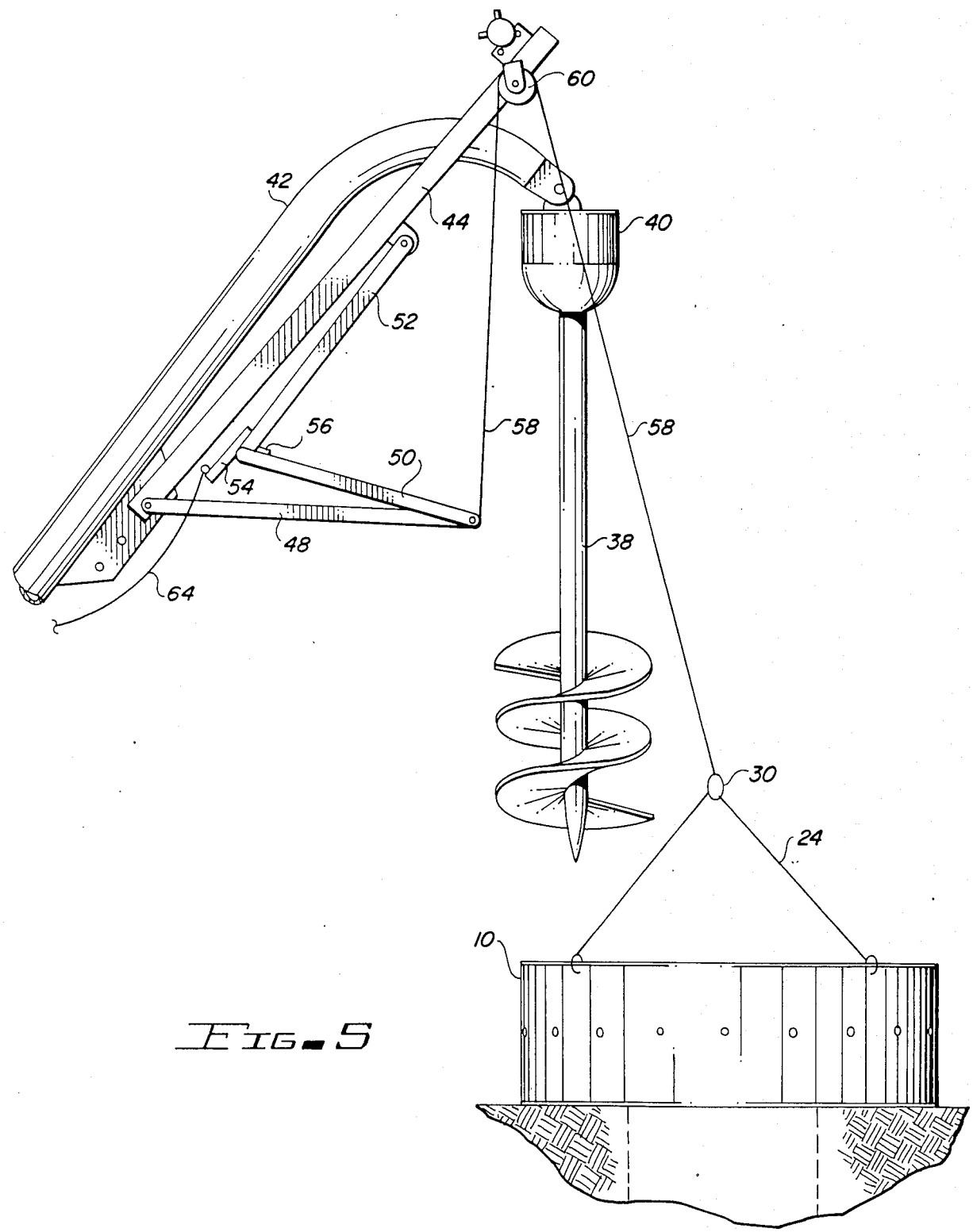
FIG. 5 is a planar view of the mechanism of FIG. 4 in which the retainer mechanism is released to a second position to allow the auger to be lifted independently.

Referring now to FIG. 1, there is shown a perspective view of one form of the inventive earth retainer in a lowered position, i.e., a position for containing earth extracted from an auger dug hole. The retainer includes a first outer cylinder 10 formed of a relatively stiff sheet metal. The diameter and height of the outer cyclinder 10 are chosen to be sufficient to contain the amount of dirt which is to be extracted from a hole. The retainer also includes an inner cylinder 12 arranged concentrically with the outer cylinder 10 but having a height of approximately half that of the outer cylinder 10. The diameter of the inner diameter 10 is chosen to be a nominal close fit for the size of hole which is to be drilled through the cylinder. The outer cylinder 10 is attached to the inner cylinder 12 by means of a flexible conical chute 14 having a larger diameter which is attached to the inside surface of the outer cylinder 10 and a smaller diameter which is attached to the outer surface of the inner cylinder 12. The flexible conical chute 14 is preferably made of a reinforced treated cloth material such as polyester cloth with vinyl laminate to provide strength and to resist deterioration. The chute may be made from a flexible plastic material if desired. Additionally, the outer cylinder 10 and the inner cylinder 12 could be made from a plastic material although a sheet steel material is preferred in order to avoid damage caused by bumping against the auger used to drill the hole through the cylinder 12. The chute 14 may be made of a plurality of panels which are sewn together to form a truncated cone or may be especially manufactured as a single piece unit.

The chute 14 is attached to the outer cylinder 10 along a line approximately midway of the height of the cylinder 10 by means of a securing ring 16 and a plurality of fasteners 18. The attachment line may be varied as required to accomodate different volumes of earth. The fasteners 18 may be rivots or screws or other types of metallic fasteners which can pass through the ring 16 and the outer cylinder 10 while compressing the chute material 14 along an upper edge between the ring 16 and cylinder 10. The smaller diameter of the conical chute 14 is attached to the top outside surface of the inner cylinder 12 by means of a second ring 20 (shown in FIG. 2) and a plurality of fasteners 22. The securing rings 16 and.20 are preferably formed of flat bar steel rolled into circles of a diameter sufficient to allow the chute material to be clamped against the respective surfaces of the outer and inner cylinders.

In an exemplary form for use with an 18 inch diameter auger, the inner cylinder 12 has a height of 7 inches and an inside diameter of 20 inches while the outer cylinder 10 has a height of 12 inches and a diameter of 36 inches. For an auger of 24 inch diameter, the inner cylinder is 7 inches in height with an inside diameter of 27 inches while the outer cylinder 10 is 15 inches high and 48 inches in diameter.

In order to manipulate the earth retainer, there are provided lifting handles 24 and 26 formed of flexible cables. Preferably the handles 24 and 26 comprise chains which are attached to the outer cylinder 10. The handle 24 is attached to the cylinder 10 at two points by means of a U-shaped fastening device 28 which includes a lower pin passing through the wall of the outer cylinde 10. Similarly, the handle 26 is also attached to the upper section of outer cylinder 10 by means of devices 28. Preferably, the four devices 28 are positioned about the upper edge of cylinder 10 in a pattern such that the cylinder 10 is divided into four quadrants. Such an arrangement serves best to equalize the lifting at all four lifting points and to maintain the retainer in a relatively horizontal position for causing the earth which is captured by the chute 14 to slide out of the chute and through the inner cylinder 12. Each of the handles 24 and 26 includes a connecting link 30 for attachment to a lifting mechanism.

Referring to FIG. 2, there is shown a view of the retainer of FIG. 1 in a raised position, i.e., a position in which any earth within the container is caused to slide down the chute and out of the retainer through the inner cylinder 12. As can be seen in this figure, the retainer assumes a substantially funnel shape when raised so that gravity acts on any material captured in the retainer and causes it to fall through the inner cylinder 12.

FIG. 3 is a top view looking down on the retainer which illustrates another embodiment of the invention in which the inner and outer cylinders 10 and 12 are each formed of two half cylinders joined together by means of hinges 32. This embodiment is particularly useful during the planting of an object which is too tall for the retainer to be lifted above it, such as, for example, a post or a large tree. The side of the outer cylinder opposite the hinged side is connected together by means of a latch 34 of a type well known in the art. Although the inner chute 14 is split along the line 36 to enable the entire retainer to be placed around the tree or post, it has been found that an insignificant amount of earth is lost through the chute joint along the line 36. Furthermore, it has also been determined that it is unnecessary to provide a latch mechanism at the joint of the inner cylinder 12 opposite its hinge 32. The structural rigidity of the outer cylinder 10 and the strength of the chute material 14 is sufficient to restrain the inner cylinder 12 from movement. In the embodiment of FIG. 3, the retainer is lifted first to allow the earth to fall back into an auger drilled hole and thereafter moved horizontally in a direction to allow the retainer to be moved from around a post or tree. When the retainer is moved to the next position for preparing a planting hole, the retainer assembly is latched close using latch 34 before being lowered to set upon the ground.

Turning to FIG. 4, there is shown one arrangement of the retainer in combination with a power driven auger 38. The auger 38 is typically driven by a motorized mechanism 40 which is pivotally attached to an end of a boom 42. The boom 42 is attached to and operated from a piece of power equipment, for example, a tractor (not shown), and may be either hydraulically or cable controlled to raise and lower the auger 38. It will be appreciated that after the hole has been excavated by means of the auger 38, the auger must then be raised and moved to provide access to the hole. At this time however, it is not desired to lift the retainer since that action would result in the dirt being returned to the hole. Accordingly, in order to provide some independent operation between the auger and retainer while at the same time minimizing the amount of equipment required to operate both devices, there has been provided an innovative mechanism for allowing the retainer to be lowered in conjunction with the lowering of the auger but to remain resting at ground level while the auger is raised. This innovative apparatus comprises a second boom arm 44 which is mechanically fixed by a bolt or pin to the boom arm 42 at one end by means of a plate 46. The plate 46 is preferably welded to the boom arm 42 and has several pivot points or holes formed in it for attachment of hydraulic actuators (not shown) which raise and lower the arms 44 and 42. The support mechanism for the arm 44 comprises a bar 48 and first and second linkage arms 50 and 52, respectively. The element 44, 48, 50 and 52 form a four-bar two-position linkage arrangement. The bar 48 has one end pivotally attached to the plate 46 and a second end attached to one end of the first linkage arm 50. A second end of the linkage arm 50 is attached to an end of the linkage arm 52 and the second end of linkage arm 52 is pivotally attached to the boom arm 44 at a point intermediate its ends. It will be seen that the linkage arms 50 and 52 are arranged to permit an over-center locking position to be achieved by pushing their common connecting point away from the boom arm 44. In that arrangement, the arms are restrained from moving further off center by means of a stop. The stop comprises an arm extension 54 welded to an end of the arm 52 and a plate 56 affixed under the linkage 50. Thus, the linkage 50 will be stopped by the extension 54 resting on the plate 56. The boom arm 44 is bolted to the boom 42 at an upper end so that the boom 42 and boom arm 44 move concurrently.

The retainer is raised and lowered by a cable mechanism which is attached to the handle extensions 30. The cable mechanism includes a cable 58 which connects from the handle extensions 30 and passes over a pulley 60 which is located near the upper end of the boom arm 44. The cable 58 continues over the pulley 60 and is attached to an end of the bar 48 distal from the connecting plate 46. In the arrangement shown in FIG. 4, the earth retainer will move up and down in conjunction with movement of the auger bit 38 since the cable 58 is held in a tensioned position. It will be recalled that the retainer used the two handles 24 and 26 for lifting in order to lift the retainer vertically. In this regard the boom arm 44 is a double arm arrangement on each side of the boom 42 and has a cross-bar 62 at its upper end which supports pulley wheels 60 at opposite sides in order to effect the vertical lifting. This arrangement will become more apparent with reference to FIG. 6.

Referring now to FIG. 5, there is shown a view of the innovative locking mechanism with the linkage arms 50 and 52 in a collapsed position to allow the auger to be lifted without lifting the retainer. In order to collapse the mechanism comprising the linkage arms 50 and 52, there is provided a cable 64 which is attached to the arm extension 54. By pulling the arm extension 54 towards the boom arm 44, the linkage arms 50 and 52 will be forced to assume a collapsed position which will allow the bar 48 to rise and release the tension on the cable 58 whereby the auger 38 may be raised without raising the retainer. It should be noted that the length of the cable 58 is chosen such that with the auger in a lifted position, tension is again returned to the cable 58. The reason for returning this tension is to prevent the linkage mechanism 50 and 52 in combination with the bar 48 from returning to the over-center locked position.

An alternate and preferred method of operating the retainer mechanism when preparing holes for earth containers is to lower the auger after inserting the container prior to lifting the retainer. As the auger is lowered, the cable 58 becomes slack allowing the weight of the bar 48 to pull downward by force of gravity thereby causing the linkage mechanism comprising the linkage arms 50 and 52 to fall back into their over-center locked position. The auger and retainer can then be lifted together allowing earth to fall into the container positioned in the planting hole. It will be appreciated that this position is a preferred position for transporting the auger and retainer.

Referring to FIG. 6, there is shown an end view of the retainer and innovative lifting arrangement which illustrates the double boom arm arrangement of boom arms 44 and the crossbar 62 which supports the opposed pulley wheels 60. It will also be seen that there are in fact two cables 58 which are connected to the opposing sides of the retainer to permit uniform lifting about the retainer perimeter. As mentioned previously, the ratio of the four bar linkage arrangement, i.e., the bars 44, 48, 50 and 52 is such that the arc described by the moving end of the arm 48 is of sufficient length to permit enough cable to be free so that when the boom 42 has raised the auger 38 out of the ground, the outer cylinder 10 will still be resting on the ground.

While the invention has been described in what is considered to be a preferred embodiment, it will become apparent to those skilled in the art many modifications, variations and changes in the invention without departing from its true spirit. Accordingly, it is intended that the description be interpreted as illustrative and not in a limiting sense and that the invention be given a scope commensurate with the appended claims.

What is claimed is:

1. a method for preparing a planting hole comprising the steps of:
    (a) providing a variable shape retainer having a first outer cylinder and a second inner cylinder, the inner surface of the outer cylinder being joined to the outer surface of the inner cylinder by a flexible membrane;
    (b) placing the retainer on a surface at a location whereby the inner cylinder defines the perimeter of a desired planting hole;
    (c) placing an auger bit having an outside diameter approximating the inside diameter of the inner cylinder in a position to drill through the area defined by the inner cylinder;
    (d) drilling the planting hole using the auger whereby the earth extracted by the auger is captured between the inner and outer cylinders;
    (e) removing the auger from the drilled hole; and
    (f) lifting the outer cylinder of the retainer whereby the membrane is stretched such that the container attains a funnel shape to cause the extracted earth to fall back within the hole.

2. The method of claim 1 and including the step of inserting a container into the hole prior to lifting the outer cylinder of the retainer.

3. Planting apparatus for use with auger means for drilling holes in earth comprising:
    a relatively rigid outer cylinder, said cylinder defining an open top;
    a relatively rigid inner cylindrical element;

a flexible membrane, said membrane being attached to said outer cylinder and said inner cylindrical element so that lifting of said outer cylinder stretches said membrane to cause the apparatus to assume a substantially funnel shape;

said outer cylinder, said inner cylindrical element and said membrane being positionable about the auger means for capturing and replacing the earth drilled by the auger; and means connected to said outer cylinder for translating said outer cylinder vertically relative to the auger means.

4. The apparatus of claim 3 wherein said membrane is attached to the inner surface of said outer cylinder approximately midway of its height.

5. In a system for preparing planting holes wherein the holes are prepared by removing earth using an auger operated by power equipment, the power equipment including a boom for raising and lowering the auger, the improvement comprising:

earth retainer means for catching the earth extracted by the auger, said retainer means including an inner cylinder closely fitting around the auger, an outer cylinder concentric with said inner cylinder and a flexible membrane attaching said inner and outer cylinders; and positioning means attached to said retainer means and to the boom for raising and lowering said retainer means, said positioning means being independent of operation of the auger.

6. The system of claim 5 wherein said positioning means comprises:

a four-bar linkage arrangment having a first position for allowing said retainer means to be raised and lowered in conjunction with the auger and second position for allowing the auger to be raised and lowered independently of said retainer means; and means connecting said retainer means to said four-bar linkage arrangement.

7. The system of claim 6 wherein said connecting means comprises a flexible cable.

8. The system of claim 6 wherein said four-bar linkage arrangment comprises:

a first arm attached to the boom for movement therewith and having one end substantially co-terminous with an end of the boom at which the auger is attached;

a second arm having a first end pivotably attached to the boom at a point distal from the auger attachment point;

a third arm having a first end pivotably attached to said first arm at a point intermediate the said one end and the attachment point of said first arm to the boom;

a fourth arm having a first end attached to a second end of said second arm and a second end attached to a second end of said third arm, whereby said third and fourth arms can be positioned in a substantially straight line to force said second end of said second arm away from the end of the boom to which the auger is attached to establish the first position in which said retainer means operates concurrently with the auger, said second position being established by allowing said third and fourth arms to collapse about their common connecting point such that said second end of said second arm approaches the end of the boom to which the auger is attached, said connecting means being attached to said second end of said second arm.

* * * * *